United States Patent [19]
Bennington

[11] 3,747,611
[45] July 24, 1973

[54] DENTAL FLOSS DISPENSER
[76] Inventor: William E. Bennington, 5 Fillmore Dr., Sarasota, Fla. 33577
[22] Filed: Sept. 14, 1971
[21] Appl. No.: 180,344

[52] U.S. Cl. ............................................. 132/91
[51] Int. Cl. ........................................... A61c 15/00
[58] Field of Search ..................... 132/91, 92, 92 A

[56] References Cited
UNITED STATES PATENTS
| | | | |
|---|---|---|---|
| 1,456,279 | 5/1923 | Patterson | 132/92 A |
| 1,512,633 | 10/1924 | Peckham | 132/92 A |
| 1,986,371 | 1/1935 | Sharp | 132/92 A |

Primary Examiner—Louis G. Mancene
Assistant Examiner—J. Q. Lever
Attorney—Millen, Raptes & White

[57] ABSTRACT

This invention relates to a dental floss dispenser comprising an elongated finger section and a dental floss spool holding section. Dental floss on a spool is easily threaded from the spool section to the end of the finger section through an open slot on the side and through open slots in the finger of the dispenser. Turning of the spool to withdraw floss is controlled by a pin which engages a notch on the spool. Push button means on the side of the dispenser release the spool from the pin to permit the spool to turn.

9 Claims, 10 Drawing Figures

Patented July 24, 1973    3,747,611

INVENTOR
WILLIAM E. BENNINGTON

BY  Millen, Raptes & White

ATTORNEYS

Patented July 24, 1973

INVENTOR
WILLIAM E. BENNINGTON

BY

ATTORNEYS

Patented July 24, 1973  3,747,611
3 Sheets-Sheet 3
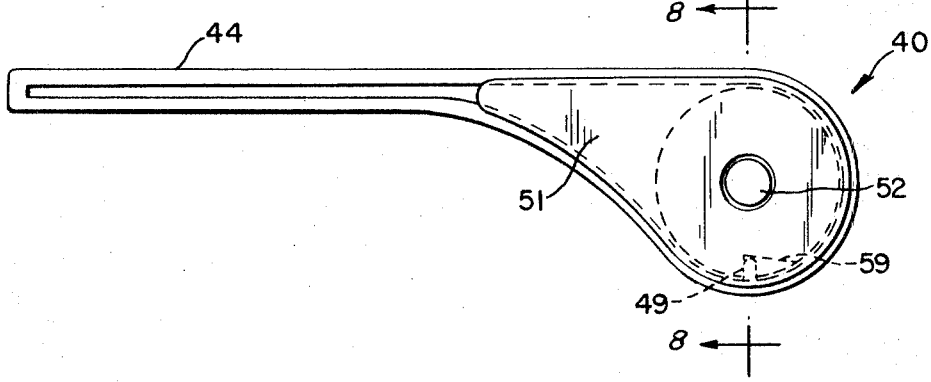
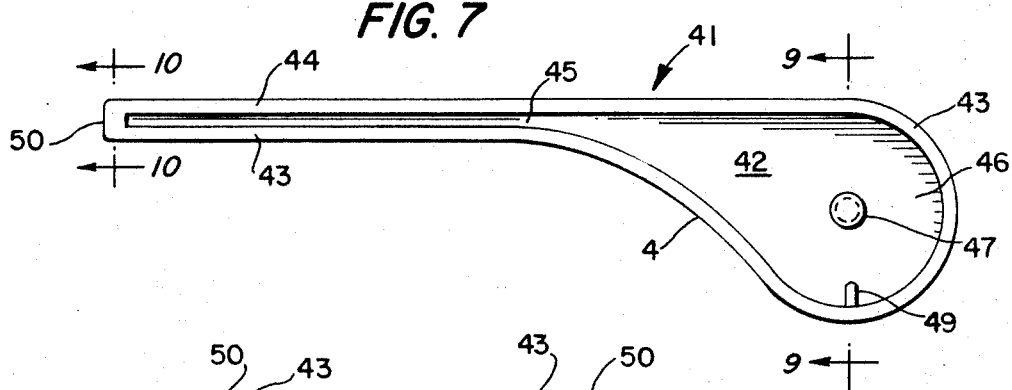
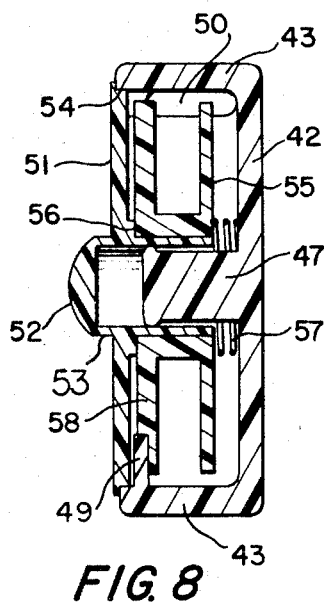
FIG. 8
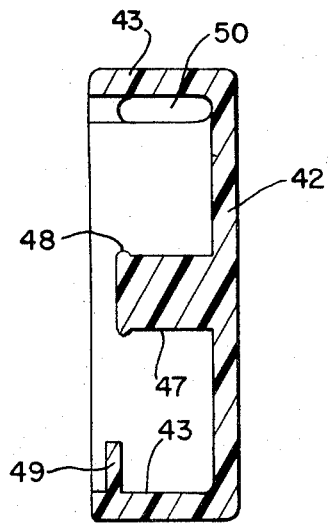
FIG. 9
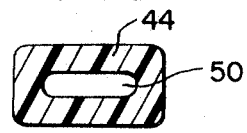
FIG. 10
INVENTOR
WILLIAM E. BENNINGTON
ATTORNEYS

DENTAL FLOSS DISPENSER

This invention relates to an improved dental floss dispenser. More particularly, it relates to a spool-type dispenser of improved design permitting easier threading of the floss in the dispenser and a simplified dispensing means.

There have been many types of dental floss dispensers developed heretofore which have the means for dispensing floss. However, many of these dispensers are complicated and expensive to manufacture. A particular problem with many of them is the difficulty in the threading of the floss through the dispenser and the ability to hold the floss taut during use.

An object of this invention is to provide a dental floss dispenser of improved design permitting easy threading of the floss through the dispenser.

Another object of this invention is to provide a dental floss dispenser having means for dispensing floss in desired lengths with an automatic stop means for positive holding the floss taut after it has been dispensed and during use.

Another object of this invention is to provide a dental floss dispenser having an extended finger which can be inserted in the mouth of the user to facilitate manipulation of the floss between the teeth for dislodging food particles.

A further object of this invention is to provide a dental floss dispenser having a spool-type reservoir of dental floss which can be turned and stopped by push button means.

Another object of this invention is to provide a dental floss dispenser having ease of handling and use which is of simplified construction and inexpensive to manufacture.

Other features and advantages of the invention will appear from the following detailed description of one specific embodiment thereof taken in connection with the drawings wherein:

FIG. 6 is a side elevational view of a modification of the dental floss dispenser;

FIG. 7 is also a side elevational view of the modification shown in FIG. 6 with the retaining cap removed;

FIG. 8 is a section along line 8—8 of FIG. 6;

FIG. 9 is a section taken along line 9—9 of FIG. 7; and

FIG. 10 is a section taken along line 10—10 of FIG. 7.

Figure 1:
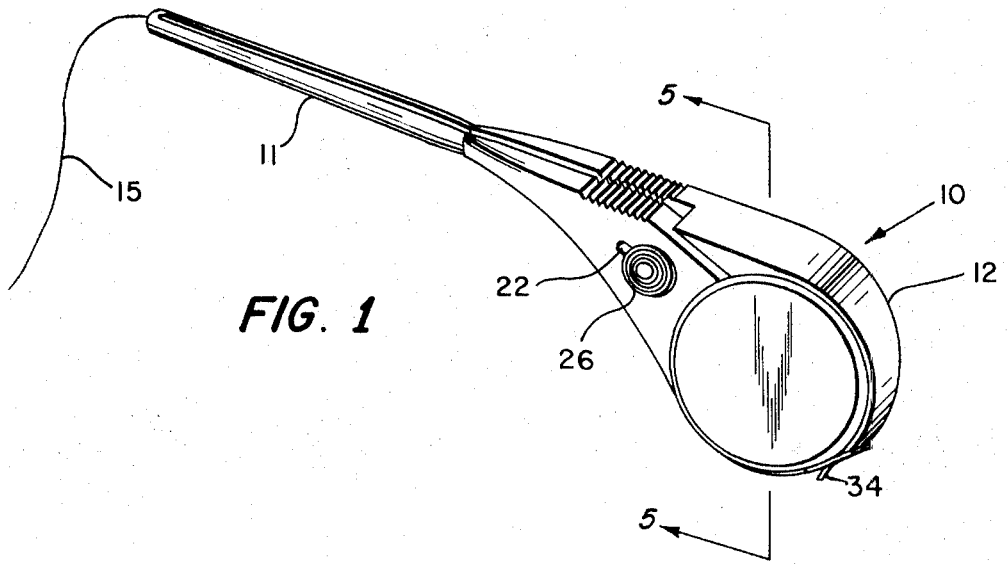
FIG. 1 is a perspective view of one embodiment of the dental floss dispenser of this invention.
Figure 2:
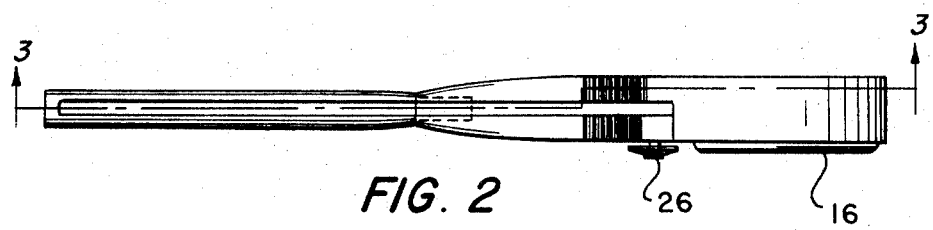
FIG. 2 is a top view of the dispenser.
Figure 3:
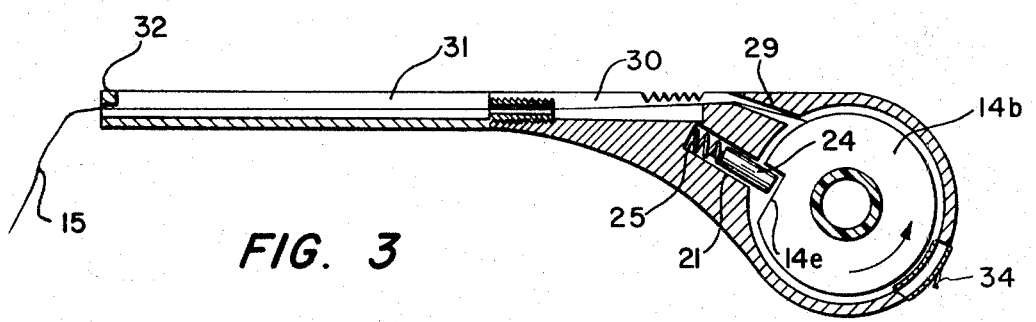
FIG. 3 is a section along line 3—3 of FIG. 2.
Figure 5:
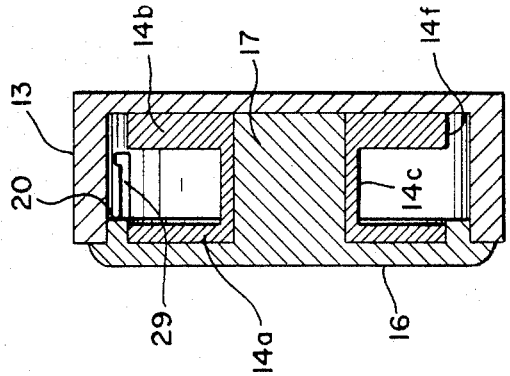
FIG. 5 is a section along line 5—5 of FIG. 1.

The dental floss dispenser generally designated by the numeral 10 in FIG. 1 comprises an extended finger section 11 and a spool section 12 held together by suitable means such as screw means 11a. The dispenser can be manufactured from a moldable plastic material as a throwaway model or from a metal such as stainless steel as a more permanent type model for use by dentists, etc.

Figure 4:
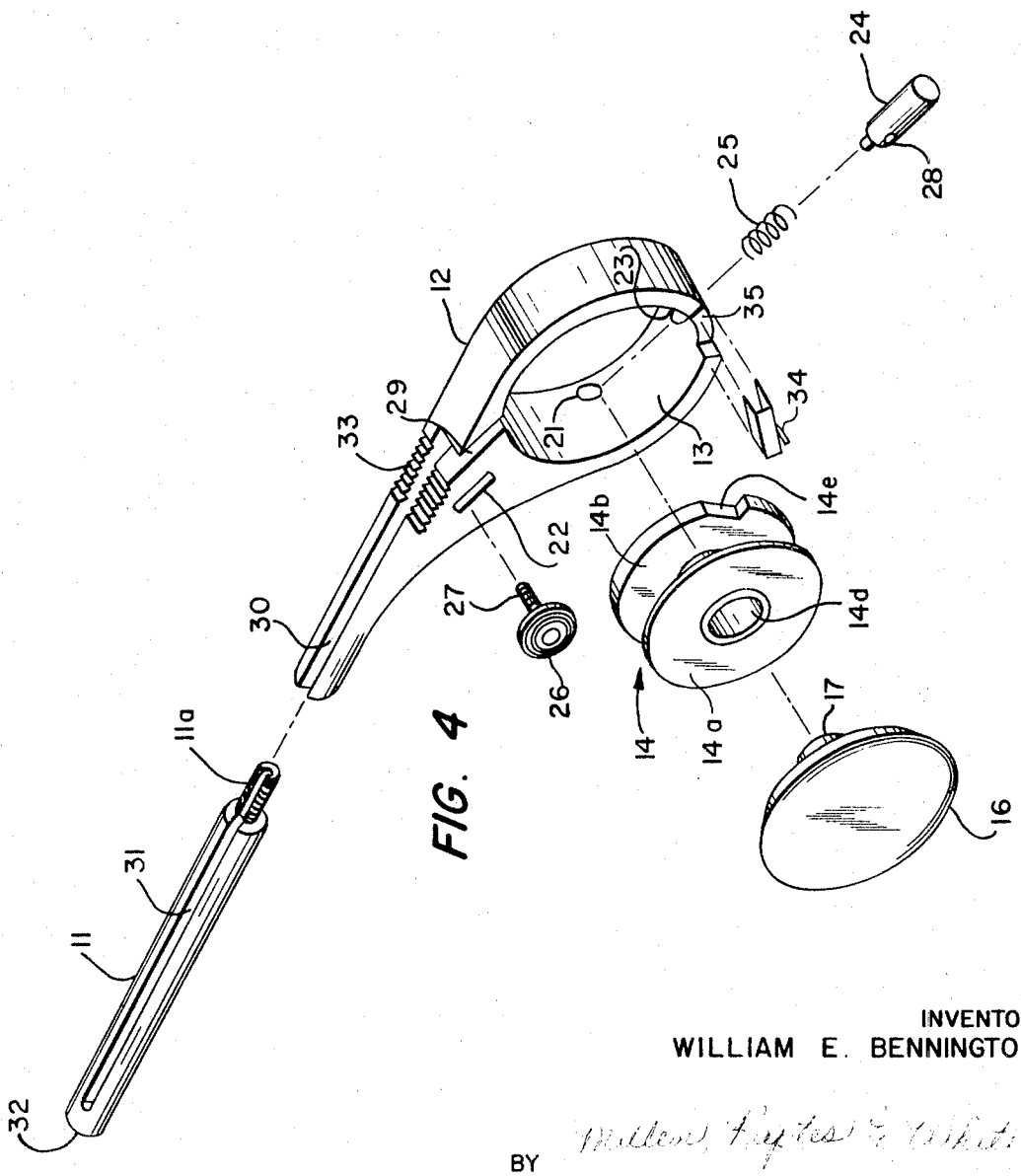
FIG. 4 is an exploded perspective view of the dispenser.

The spool section 12 comprises a retaining circular cell 13 (FIG. 4) in which a spool 14, which can have a supply of dental floss 15, is retained by means of a retaining cap 16. Spool 14 comprises two disc-like sections 14a and 14b joined together by a shaft portion 14c containing an axial hole 14d. Disc section 14b is thicker than 14a and comprises a V-notch 14e having one tapered side and the other being radial. Cap 16 is provided with an axial rod 17, which is adapted to fit within the axial hole 14d of the spool 14, and on which the spool can freely turn. Cap 16 is adapted to be removably fitted into the side of the cell 13 and can be either of the screw type, or as depicted, of the press fit type containing an annular rim 20 which snugly fits within the peripheral wall of cell 13.

Cell 13 has a bore hole 21 adapted to communicate with a milled slot 22 disposed in the side of the dispenser. Hole 21 is drilled by drilling through the rear cell wall also producing hole 23. A pin 24, biased by spring 25, is adapted to be retained in hole 21 by push button 26 which has a threaded stud 27 adapted to be screwed into threaded hole 28 of pin 24.

An end portion of pin 24 normally protrudes into the cell 13 from hole 21 and is engaged in notch 14e, thereby restraining rotation of the spool 14. Push button 26 can be moved laterally in slot 22 against the bias of spring 25 thereby moving the end portion of pin 24 out of engagement with notch 14e.

Dental floss from the spool 14 is easily threaded from the spool 14 through an open guideway 29 communicating with cell 13, through open milled slot 30 of the spool section 12, through open milled slot 31 of the finger section 11, and out end 32.

The dispenser is used by holding the spool section 12 in the palm of the hand with the index finger on serrations 33. The fingers of the other hand hold the end of a sufficient length of the floss 15. The finger portion 11 can be partially inserted with one hand into the mouth of the user and the end of the floss gripped with the other hand, thereby enabling the floss to be worked between the teeth, thereby enabling the floss to be worked between the teeth without putting the fingers into the mouth. As the floss is used, the teeth will have a tendency to shred the floss.

Whenever, a further length of floss is desired, the thumb of the hand holding the dispenser is placed on the push button 26 and moved forwardly along slot 22 to disengage pin 24 from notch 14e thereby permitting the spool 14 to turn and permit the pulling of floss from end 32. When a sufficient length is withdrawn, the thumb is released from the push button and spring 25 moves the button backwardly in slot 22. Pin 24 will then ride on surface 14f of section 14b of the spool as it is further turned by withdrawing floss until it engages notch 14e whereby spool 14 is prevented from any further turning. The floss can then be held taut again for use. Normally, the amount of floss withdrawn by one turn of the spool is sufficient for use in cleaning food particles from between the teeth.

A floss cutter 34 is adapted to be press fit in a cut-out section 35 of the rear peripheral wall of the cell 13 which also serves the purpose of covering hole 23. Used floss may be cut by bringing the floss under the cutter and pulling sharply upward.

In FIGS. 6-10, a modification of the dental floss dispenser is shown. This modification is designed to be manufactured from any conventional plastic materials, such as polyvinyl chloride, polystyrene, polyethylene, polypropylene and the like. The design is such that the dispenser can be produced entirely from molded sections.

The modification generally designated by the numeral 40 in FIG. 6 comprises two molded members. One member, generally designated by the numeral 41 in FIG. 7, comprises a rear wall 42 and a peripheral flange 43 which define a finger section 44 with an open guideway 45 and a spool retaining cell 46. A rod 47 extends axially from the rear wall 42 in spool cell 46 and has a nob member 48 at its end. A permanent pin 49 extends from the inside of peripheral flange 43 in the cell 46. The end of the finger section 44 comprises a hole 50 through which the floss is withdrawn from the dispenser.

The second member of the modification, as shown in FIG. 8, is a flexible retaining cap 51 which covers cell 46 and the open guideway leading to the finger section. The cap comprises button means 52 and a cylindrical portion 53 adapted to snugly fit over the nob member 48 and rod 47 and is press fitted into peripheral flange 43 and held in place by means of peripheral rim 54.

Spool 55 is adapted to fit on cylindrical portion 53 and on which it can freely turn. Shoulder 56 of cap 51 abuts the spool and when button 52 is pushed will move the spool against the bias of a spring 57 on rod 47. Disc section 58 of the spool is provided with a V-notch 59 (FIG. 6) adapted to engage pin 49 and prevent turning of the spool. When button 52 is pushed, the flexible wall of the cap will permit movement of shoulder 56 against the spool, the notch 59 will be released from the pin 49, and the spool will be free to turn.

The dispenser 40 is easily loaded and threaded. Cap 51 carrying spool 55 is pressed onto rod 47, carrying spring 57, with a length of floss pulled from the spool. The floss is threaded onto guideway 45 and out end 50.

The modified dispenser 40 has the advantage that an inexpensive dispenser can be essentially produced from only two molded parts and used with a replaceable spool of dental floss. However, it is also contemplated that the entire dispenser can be discarded after exhaustion of the supply of floss on the spool, in view of the fact that the dispenser is inexpensive to produce.

It will be understood that modifications, within the scope of the appended claims may be made in the design and arrangment of parts without departing from the spirit of the invention.

What is claimed is:

1. A dental floss dispenser adapted to dispense a metered amount of dental floss comprising in combination, a finger section communicating with a spool section, a freely turnable spool of dental floss in said spool section and retaining cap means for retaining said spool in said spool section, said spool containing a notch at its outer periphery, a resiliently biased pin protruding into said spool section and normally engaging said notch of said spool to retain said spool from turning, means for releasing said pin from said notch permitting said pin to freely turn on the periphery of said spool upon withdrawal of dental floss from the end of said finger section until said pin engages said notch after one rotation of said spool to thereby dispense a metered amount of dental floss, and open guideway means in said spool and finger sections adapted to permit easy threading and for passage of floss from said spool section through said finger section and out the end of said finger section.

2. The dental floss dispenser of claim 1, wherein said guideway means comprises a first open slot on the side of said spool section permitting passage of floss therein from said spool, and a second open slot communicating with said first slot extending longitudinally along the top of said spool and finger section.

3. The dental floss dispenser of claim 1, wherein said pin is retractable and spring biased.

4. The dental floss dispenser of claim 3, wherein said retractable pin is operable by slidable push button means.

5. The dental floss dispenser of claim 1, wherein the top of said spool section is provided with serrations.

6. The dental floss dispenser of claim 1, wherein said spool is turnable on an axial pin protruding from said retaining cap means.

7. The dental floss dispenser of claim 3, wherein said retractable pin is disposed within a hole communicating with said spool section.

8. The dental floss dispenser of claim 4, wherein said spring biased retractable pin is connected to said slidable push button means operable along slot means.

9. The dental floss dispenser of claim 1, wherein a floss cutter is disposed on said dispenser.

* * * * *